Nov. 20, 1923.

T. L. EVERETT

ANTISKIDDING DEVICE

Filed Feb. 21, 1923

1,474,518

Inventor
T. L. Everett
Watson E. Coleman
Attorney

Patented Nov. 20, 1923.

1,474,518

UNITED STATES PATENT OFFICE.

THOMAS L. EVERETT, OF WELLSBURG, WEST VIRGINIA, ASSIGNOR OF ONE-HALF TO FRANK E. FOSTER, OF WELLSBURG, WEST VIRGINIA.

ANTISKIDDING DEVICE.

Application filed February 21, 1923. Serial No. 620,413.

*To all whom it may concern:*

Be it known that I, THOMAS L. EVERETT, a citizen of the United States, residing at Wellsburg, in the county of Brooke and State of West Virginia, have invented certain new and useful Improvements in Anti-skidding Devices, of which the following is a specification, reference being had to the accompanying drawings.

This invention relates to certain improvements in anti-skidding devices and it is an object of the invention to provide a novel and improved device of this general character which can be readily and effectively applied to the tire of a wheel and which, when so applied, serves effectively to prevent both slipping and skidding.

Another object of the invention is to provide a novel and improved device of this general character which can be easily and effectively applied upon a wheel without the necessity of jacking the wheel.

An additional object of the invention is to provide a novel and improved device of this general character comprising a plurality of tread members with which is associated a single side member, said side member providing means whereby the tread members are held in applied position.

The invention consists in the details of construction and in the combination and arrangement of the several parts of my improved anti-skidding device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1:
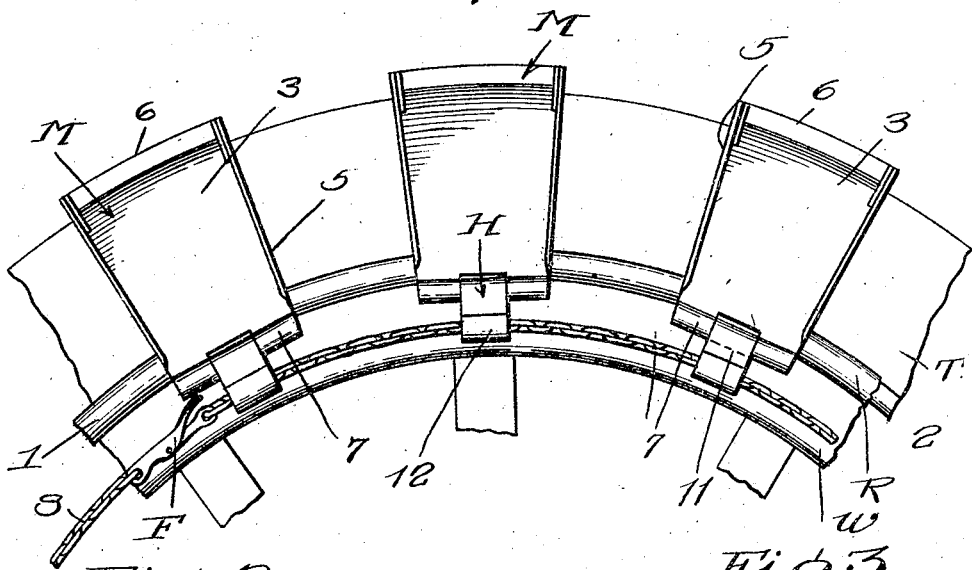
Figure 1 is a fragmentary view in side elevation illustrating an anti-skidding device constructed in accordance with an embodiment of my invention and in applied position.
Figure 2:
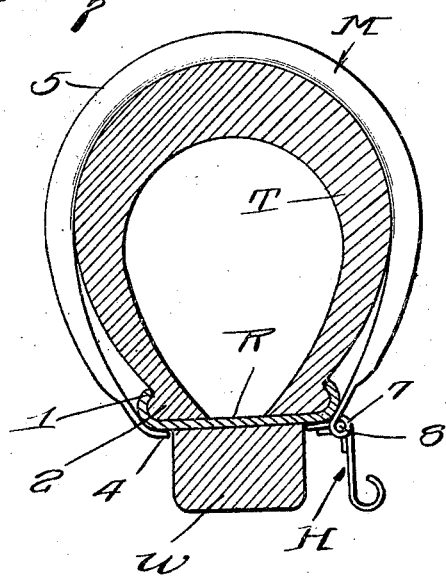
Figure 2 is a cross sectional view taken through the structures illustrated in Figure 1 with a tread member of my device in elevation.
Figure 3:
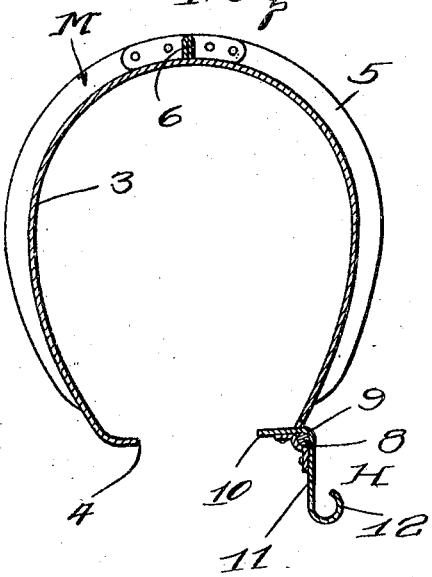
Figure 3 is a sectional view taken through one of the tread members.

As disclosed in the accompanying drawings, W denotes a wheel provided with a rim R for a tire T. The rim is of conventional construction having the marginal flanges 1 for coaction with the beads 2 of the tire T. The tire T may be solid or pneumatic.

My improved invention as herein disclosed comprises a plurality of tread members M. Each of these members M comprises a relatively broad arcuate plate 3 which, when the member is applied, straddles the tire T. One end portion of the member is provided thereacross with an inwardly disposed lip 4 which has contacting engagement beneath a side flange of the rim R and preferably the inner flange when the wheel W is applied.

The side marginal portions of the plate 3 is defined by the outstanding flanges 5 which provide effective means to prevent slipping.

Interposed between the flanges 5 and at substantially the longitudinal center of the plate 3 is a transversely disposed flange 6 which provides an effective means to prevent skidding. The opposite end portion of the plate 3 is provided with a pair of transversely spaced barrels or knuckles 7 through which is disposed a pintle or pivot pin 8. This pintle or pin 8 is also disposed through an eye 9 arranged at the heel portion of the holding member H.

The member H is substantially in the form of an inverted L and its foot or short arm 10 is adapted to be arranged beneath and in contacting engagement with the adjacent or outer flange 1.

The stem or long arm 11 of the member H is provided at its outer end with a rounded lip or sleeve 12 which is engaged with the side chain or member S.

The side chain or member S may be as preferred and has its extremities connected by a fastening means F of a conventional type.

It is to be noted that the flange 6 is formed from a single sheet of material bent to form overlying portions. The connected ends of said portions being outwardly disposed while the opposite ends of said portions are oppositely directed to provide means whereby the flange 6 may be effectively engaged with the flanges 5 to hold said flange 6 in applied position.

In applying my improved device the tread members M are disposed over the tread portion of the tire with the lips 4 in contacting engagement from within with the inner flange of the rim R and with the side chain or member S positioned at the outer face of the wheel W. When the extremities of the chain are connected by the fastening means F the stems or long arms 11 of the holding members H will be swung inwardly of the wheel W resulting in the feet or short arms 10 having contacting engagement beneath the outer or adjacent flange of the rim, whereby the members M are effectively held in working position upon the tire T through the instrumentality of the side chain or member S. Upon release of the fastening means F my improved anti-slipping device can be readily and conveniently removed.

It is to be particularly noted that the construction of my improved anti-slipping device is such that it can be easily applied to the tire T on the wheel W without the necessity of jacking up the wheel and also under the most adverse conditions.

From the foregoing description it is thought to be obvious that an anti-skidding device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An anti-skidding device comprising a plurality of tread members adapted to straddle the tread portion of a tire, each of said tread members being provided with an inwardly disposed lip to engage beneath the marginal portion of the tire carrying rim, means carried by the opposite end of each of the tread members to engage beneath the second marginal portion of the tire carrying rim, and means for holding the last named means in such position.

2. An anti-skidding device comprising a plurality of tread members adapted to straddle the tread portion of a tire, each of said tread members being provided with an inwardly disposed lip to engage beneath the marginal portion of the tire carrying rim, means carried by the opposite end of each of the tread members to engage beneath the second marginal portion of the tire carrying rim, a side member operatively engaged with the last named means, said side member when applied serving to hold said means in proper engagement with the rim.

3. An anti-skidding device comprising a plurality of tread members adapted to straddle the tread portion of a tire, each of said tread members being provided with an inwardly disposed lip to engage beneath the marginal portion of the tire carrying rim, and a swinging member carried by the opposite end portion of each of the tread members, said swinging member having two arms, one arm being engageable from within with the adjacent marginal portion of the tire carrying rim, and means coacting with the second arm of the swinging member to hold the first named arm thereof in such position.

4. An anti-skidding device comprising a plurality of tread members adapted to straddle the tread portion of a tire, each of said tread members being provided with an inwardly disposed lip to engage beneath the marginal portion of the tire carrying rim, and a swinging member carried by the opposite end portion of each of the tread members, said swinging member having two arms, one arm being engageable from within with the adjacent marginal portion of the tire carrying rim, a side member operatively engaged with the second arm of the swinging member of each of the tread members for maintaining the first arm of each of said swinging members in engagement with the tire carrying rim.

In testimony whereof I hereunto affix my signature.

THOMAS L. EVERETT.